United States Patent [19]

Balcar

[11] Patent Number: 5,458,230
[45] Date of Patent: Oct. 17, 1995

[54] CENTER LOADING CONVEYOR ASSEMBLY

[76] Inventor: James E. Balcar, 2602 Branch Water Cir., Jasper, Ala. 35501

[21] Appl. No.: 213,600

[22] Filed: Mar. 16, 1994

[51] Int. Cl.$^6$ .................................................. B65G 21/20
[52] U.S. Cl. ..................... 198/836.3; 198/836.1
[58] Field of Search ................. 198/525, 836.1, 198/836.3, 806, 808

[56] References Cited

U.S. PATENT DOCUMENTS

| | | |
|---|---|---|
| 977,987 | 12/1910 | Willson, Jr. . |
| 2,488,980 | 11/1949 | Madeira . |
| 2,798,591 | 7/1957 | Stamos ........................... 198/836.3 X |
| 2,988,202 | 6/1961 | Pampel et al. .................. 198/836.3 X |
| 3,300,023 | 1/1967 | Creutzmann et al. . |
| 3,303,924 | 2/1967 | Hartzell, Jr. . |
| 3,593,841 | 7/1971 | Leow . |
| 3,679,042 | 7/1972 | Smoker et al. . |
| 4,754,864 | 7/1988 | Cross, Jr. . |
| 4,917,232 | 4/1990 | Densmore ........................... 198/808 X |
| 5,048,669 | 9/1991 | Swinderman . |
| 5,246,099 | 9/1993 | Genovese . |
| 5,267,642 | 12/1993 | Gharpurey et al. ............... 198/836.3 X |

FOREIGN PATENT DOCUMENTS

| | | | |
|---|---|---|---|
| 0134505 | 3/1979 | Germany ............................ 198/836.3 |
| 2852524 | 6/1980 | Germany ............................ 198/836.1 |
| 0228231 | 10/1985 | Germany ............................ 198/836.3 |
| 1553472 | 3/1990 | U.S.S.R. ............................. 198/836.1 |

Primary Examiner—James R. Bidwell
Attorney, Agent, or Firm—Pearne, Gordon, McCoy & Granger

[57] ABSTRACT

A method and apparatus for ensuring the deposition of material onto a center portion of a conveyor belt during any lateral shifting of the belt from a centered position. The apparatus includes a frame supporting a belt between head and tail pulleys. A carriage having side loading skirts is provided which is transversely shiftable in response to lateral shifting of the belt so that the loading skirts direct material to a central portion of the belt even if the belt shifts transversely.

8 Claims, 5 Drawing Sheets

CENTER LOADING CONVEYOR ASSEMBLY

BACKGROUND OF THE INVENTION

This invention relates to belt conveyors and, more particularly, to an assembly for loading material onto the central area of a conveyor belt under conditions where the conveyor belt shifts from its predetermined centered position along the conveyor frame and relative to the head and tail pulleys of the conveyor.

A belt conveyor for transporting aggregate material is generally a trough-type conveyor which may be loaded at the tail section of the conveyor by another conveyor, or in mining operations, by a mining machine. The conveyor may also be loaded at any point along its length by another conveyor or by itself in those instances where the belt is stepped to a lower position by forming an "S" curve. Belt conveyors are provided with edge aprons which direct the material being loaded to the central portion of the conveyor belt. Under ideal conditions, these conveyors perform their intended functions. However, conditions are seldom ideal, particularly in coal mining operations where belt sections are removed or replaced to shorten or lengthen the conveyor or belt sections are spliced if the belt should break. Spliced belt joints tend to displace the belt as the splice travels along the idler rollers, and as a result, the belt tends to shift laterally from its centered position. This lateral shifting is frequently sufficient to expose the idler pulleys or the drive pulleys, and the material being loaded will miss the conveyor belt and foul mechanisms in the conveyor. The presence of coal or rock in the moving mechanisms frequently causes expensive breakage and disastrous down time.

In view of the above problems, attempts have been made to restrict belt shifting by mechanical constraints or by rollers which are skewed or steered to induce the belt to return to a centered position. Mechanical restraint of the belt is largely ineffective since frictional and inertial forces of the belt are extremely difficult to resist. Mechanical stops, therefore, tend to either tear up the belt or be damaged themselves. Skewing or canting rolls are expensive and must be hydraulically or mechanically linked to electronic edge sensing guides, and such sensitive equipment does not have a long life in a hostile environment, such as a mine.

BRIEF DESCRIPTION OF THE INVENTION

This invention overcomes many of the prior art problems by providing an endless belt conveyor having loading stations which include loading skirts which direct material onto a central portion of the belt. The loading skirts are mounted for movement relative to the conveyor frame in directions transverse to the path of travel of the belt. Sensors are responsive to any lateral shifting of the belt from its predetermined longitudinal path to shift the skirts in directions and amounts corresponding to the directions and amounts of the lateral shifting of the belt. According to a preferred aspect of this invention, the sensors comprise side rollers which are positioned to be engaged by the belt upon lateral shifting thereof. The side rollers are rotatably mounted on a carriage which also mounts the loading skirts, and the carriage is mounted on transverse guide rollers which permit lateral movement of the carriage relative to the conveyor frame. Thus, while the belt loading mechanism discharges material from a fixed point, any shifting of the belt will be tracked by the moveable skirts so that the material is always loaded on a center portion of the belt. Thus, the material to be loaded is not discharged on the conveyor belt at an off-center location which tends to cause spillage throughout the length of the conveyor. In addition to costly clean-up problems, some of the material may travel back to the tail section of the conveyor along the return reach to break or damage the belt. Further, mechanical breakdown and motor failure can occur at the drive end of the conveyor when the belt is restricted by foreign matter between the tail pulley and the belt.

DETAILED DESCRIPTION OF THE INVENTION

Figure 1:
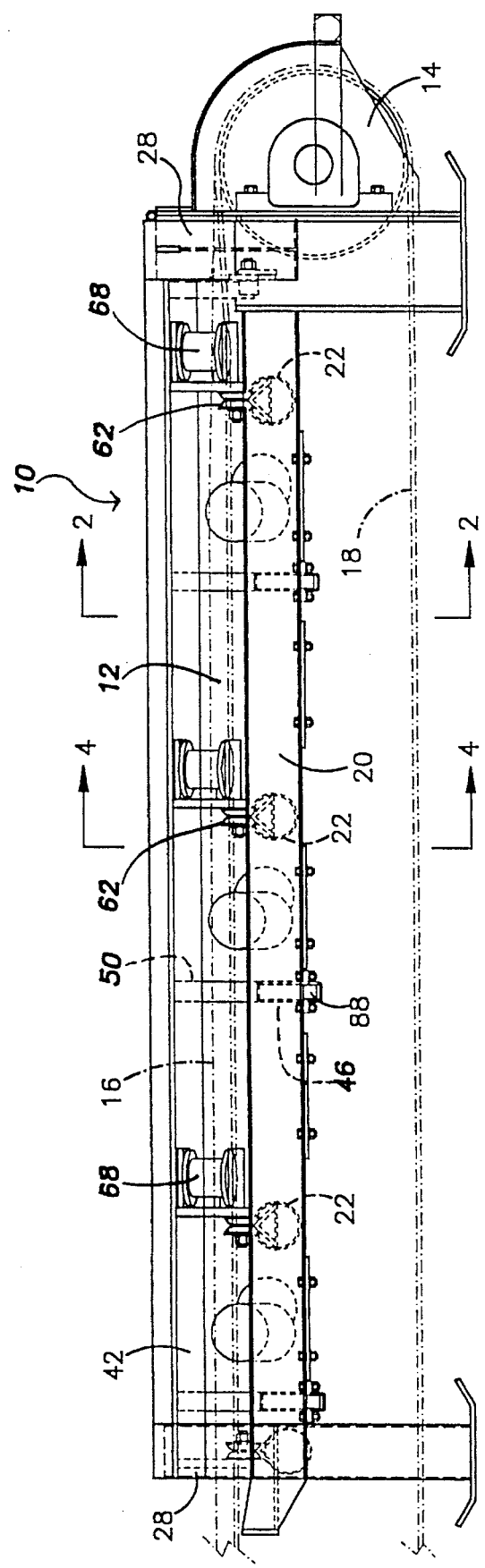
FIG. 1 is an elevational view illustrating the invention as embodied in the tail section of a belt conveyor.

Referring now to the drawings, there is illustrated a tail section 10 of a belt conveyor. The tail section 10 includes an endless belt 12 which is wrapped around a tail pulley 14 and which has an upper material conveying reach 16 and a return reach 18. The tail section 10 includes parallel and longitudinally extending side frame rails 20 which are tied together by transverse, cylindrical tubes 22. A plurality of troughing idler rolls 23 are mounted to support the upper reach of the belt 12 in a troughed configuration and are supported by mounting posts (not shown). Longitudinal aprons or skirts 24 and 26 are pivotally connected to upright support beams 28 by pins 30. Each skirt 24 and 26 is provided with a flexible, rubber lip 32.

The conveyor belt arrangement thus far described is a conventional arrangement for transporting material, such as, for example, coal, over relatively long distances. In an ideal conveying arrangement, the belt 12 is precisely centered with its longitudinal edges 34 and 36 slightly overlapped by the lips 32 of the skirts 24 and 26. In actual practice, however, the conveying belt 12 tends to shift laterally along its length so that one edge 34 or 36 exposes the idler rollers 24 and associated conveying mechanisms.

According to this invention, there is provided a sensing arrangement which is responsive to any lateral shifting of the belt 12 from its predetermined longitudinal path to shift an auxiliary skirt and associated lips in directions and amounts corresponding to directions and amounts of the lateral shifting of the belt.

Figure 2:
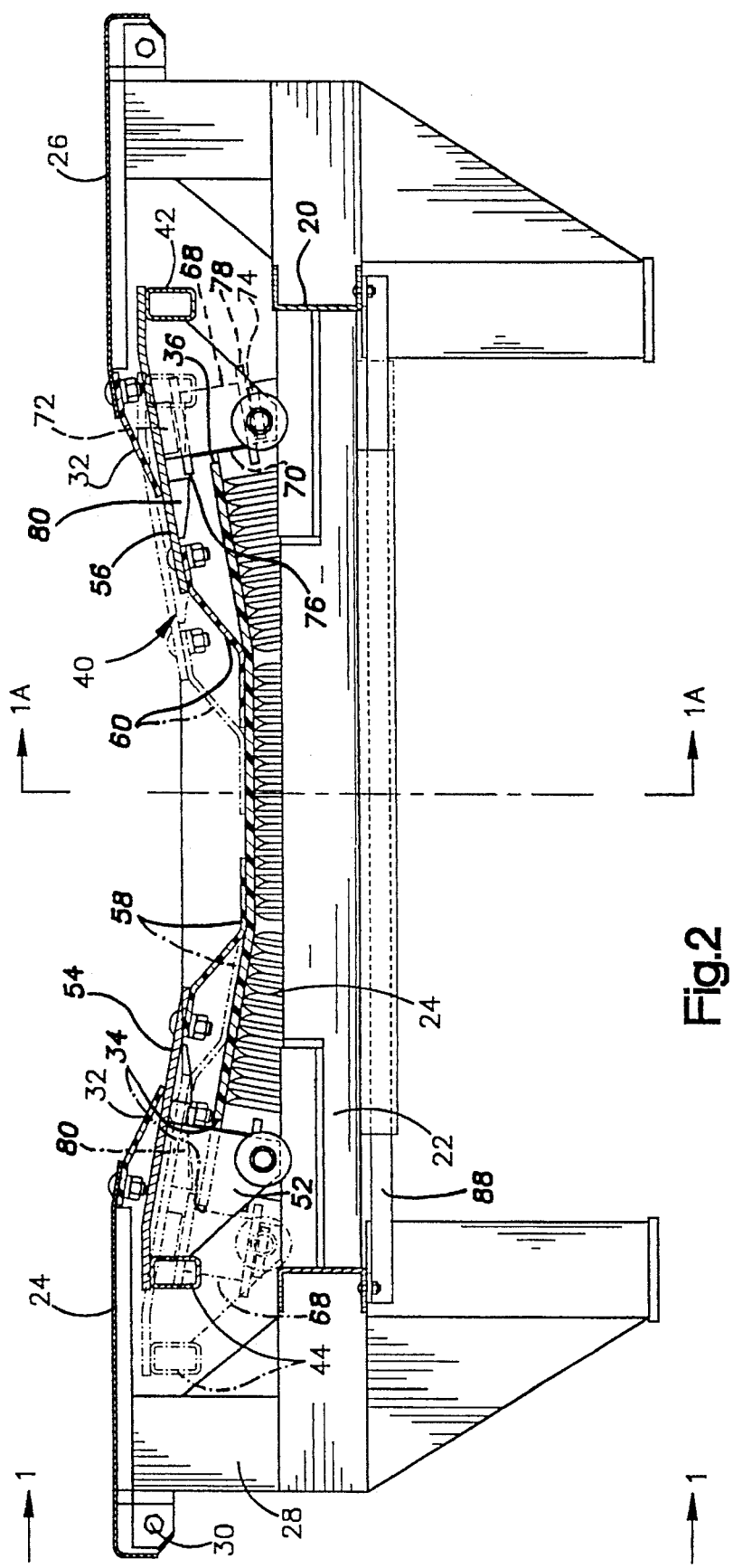
FIG. 2 is a cross-sectional view, the plane of the section being indicated by the line 2—2 in FIG. 1.
Figure 4:
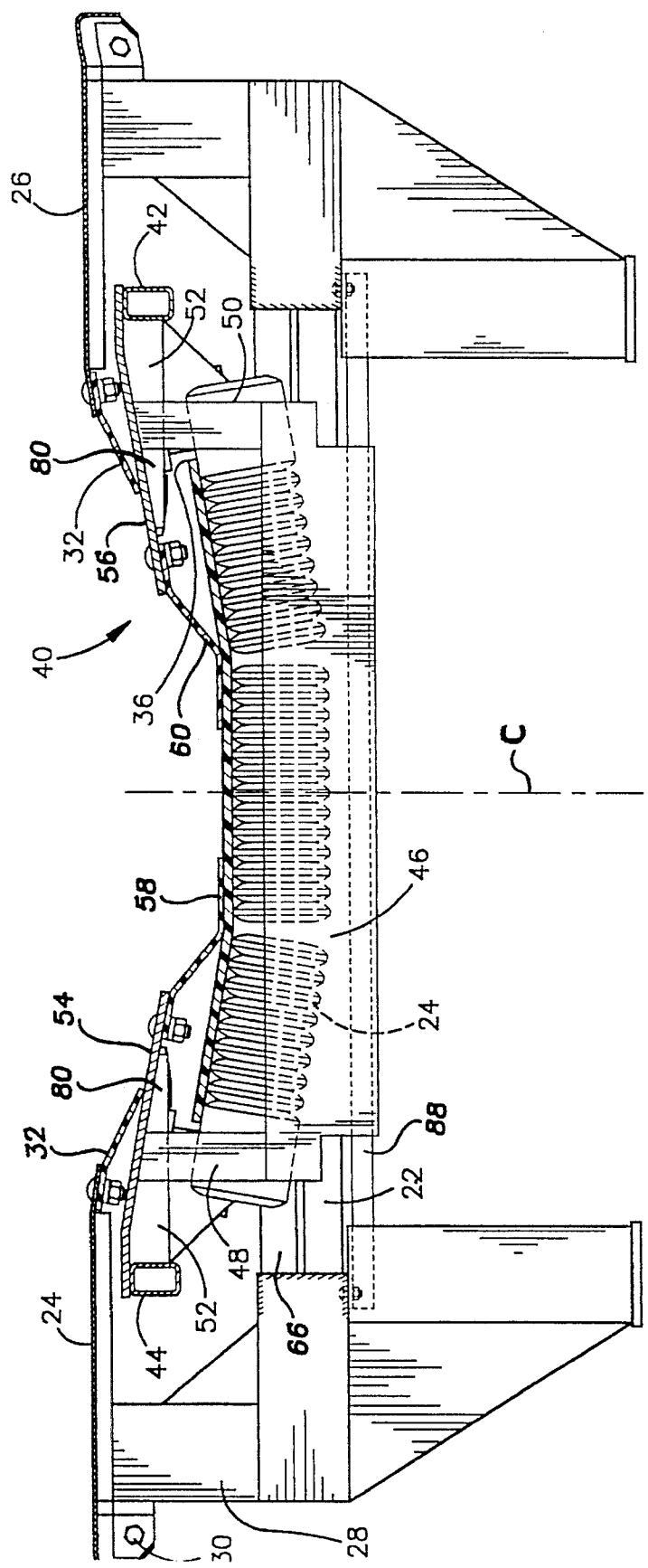
FIG. 4 is a cross-sectional view, the plane of the section being indicated by the line 4—4 in FIG. 1.

Referring again to the drawings, there is illustrated a carriage 40 having parallel side supporting rails 42 and 44, which are tied together by a series of rectangular tubes 46. The tubes 46 are provided with vertical, rectangular tubes 48 and 50 at their ends, and the tubes 48 and 50 are, in turn, fixed to the supporting rails 42 and 44. A plurality of mounting brackets 52 are also fixed to the supporting rails 42 and 44 which, with the supporting rails 42 and 44, support longitudinally extending auxiliary skirts 54 and 56. Each auxiliary skirt 54 and 56, in turn, is provided with a flexible lip 58 and 60 which is biased against the belt 12. Thus, the skirts 24 and 26 and their lips 32 together with the auxiliary skirts 54 and 56 and their lips 58 and 60 cooperate with the belt 12 to form a protective cover for the conveying mechanisms. The mounting brackets 52 also support transverse rollers 62. Each roller 62 is provided with a V-shaped rolling surface 64 which cooperates with a V-shaped track 66 provided at the ends of each transverse tube 22. Thus, the assembly comprising the rails 42 and 44 and the rectangular tubes 46, 48 and 50, together with the auxiliary skirts 54 and 56 and the lips 58 and 60, are adapted to shift laterally with respect to a center line C (FIG. 4) of the tail frame. The support brackets 52 also carry a plurality of edge rollers 68 having cylindrical walls 70 adapted to cooperate with the edges 34 and 36 of the belt. As may be seen most clearly in FIG. 2, each roller 68 is mounted between plates 72 and 74 in such a manner that the cylindrical surface 70 of each roller 68 is canted with respect to the vertical so that the edges 34 and 36 of the belt abut the surface at an angle of approximately 90°.

Thus, if the belt 12 tends to shift from its normally centered position, an edge 34 or 36 of the belt will bear against the rollers 68 to move the entire carriage 40 with the belt so that the lips 58 and 60 move laterally with the center portion of the belt in unison. Material deposited on the belt, therefore, will always be centered with respect to the belt, even though it may be somewhat offset from the center line of the frame.

As was previously stated, the rollers 68 will be engaged by the belt edges 34 and 36 at an angle of about 90°. This is to minimize any deflection of the belt upwardly or downwardly along the surface of the roller 68. Also, to ensure proper engagement between the edges 34 and 36, end flanges 76 and 78 are provided on the rollers 68, and guide ramps 80 are provided on the undersurface of the skirts 54 and 56.

Figure 1A:
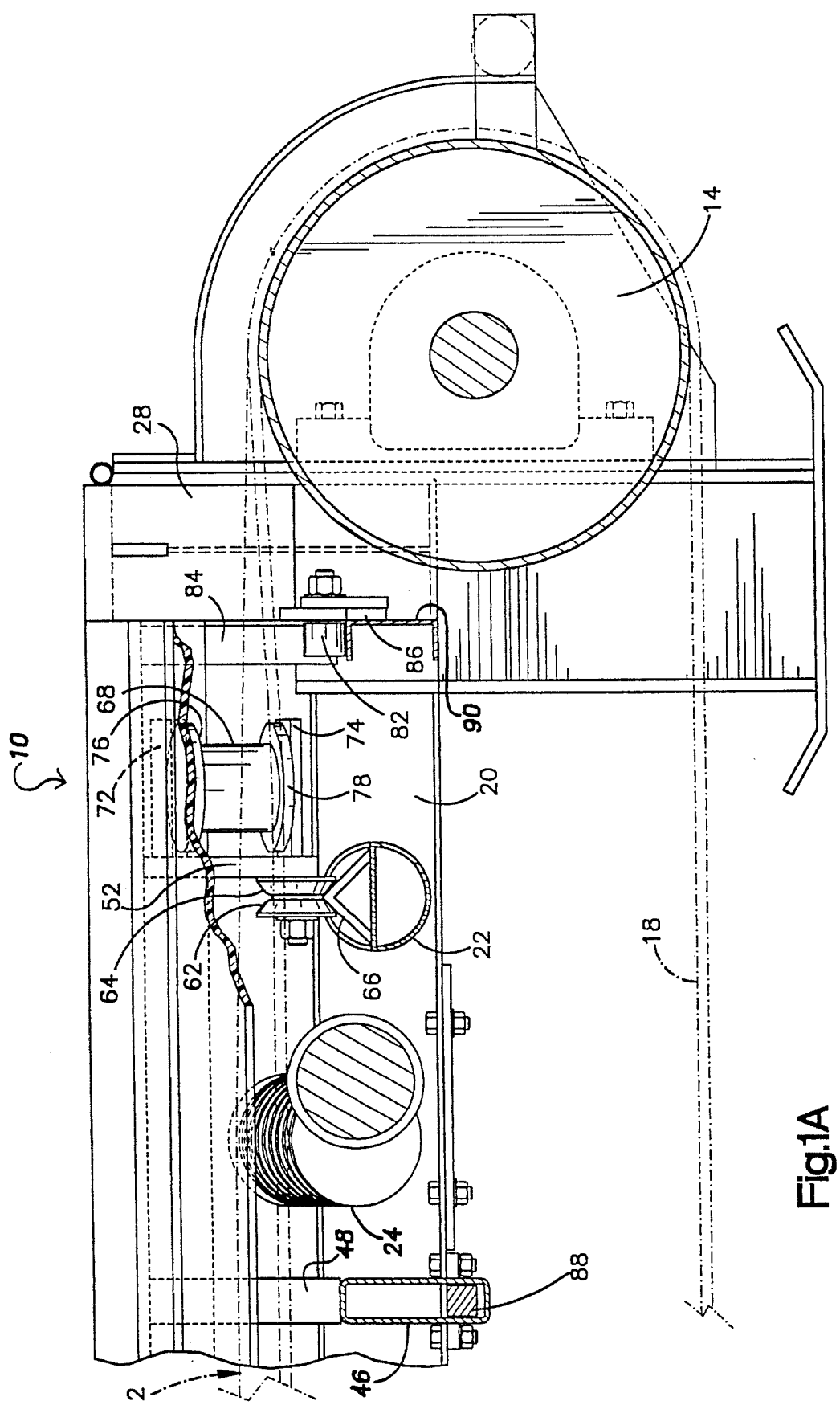
FIG. 1A is a cross-sectional view, the plane of the section being indicated by the line 1A—1A in FIG. 2.

The V-shaped tracks 66 and the V-shaped rolling surfaces 64 on the transverse rollers 62 ensure that debris will not interfere with the proper transverse rolling action. Further, the transverse, tubular beams 46 are restrained against upward movement which would tend to derail the transverse rollers 62 by cross bars 88 which extend through the beams 46 and which are fixed to the frame members 20. As may be seen in FIG. 1A, a slight clearance is provided between the bars 88 and the tubes 46, but that clearance is less than the amount of upward movement which would permit derailment of the carriage.

Figure 3:
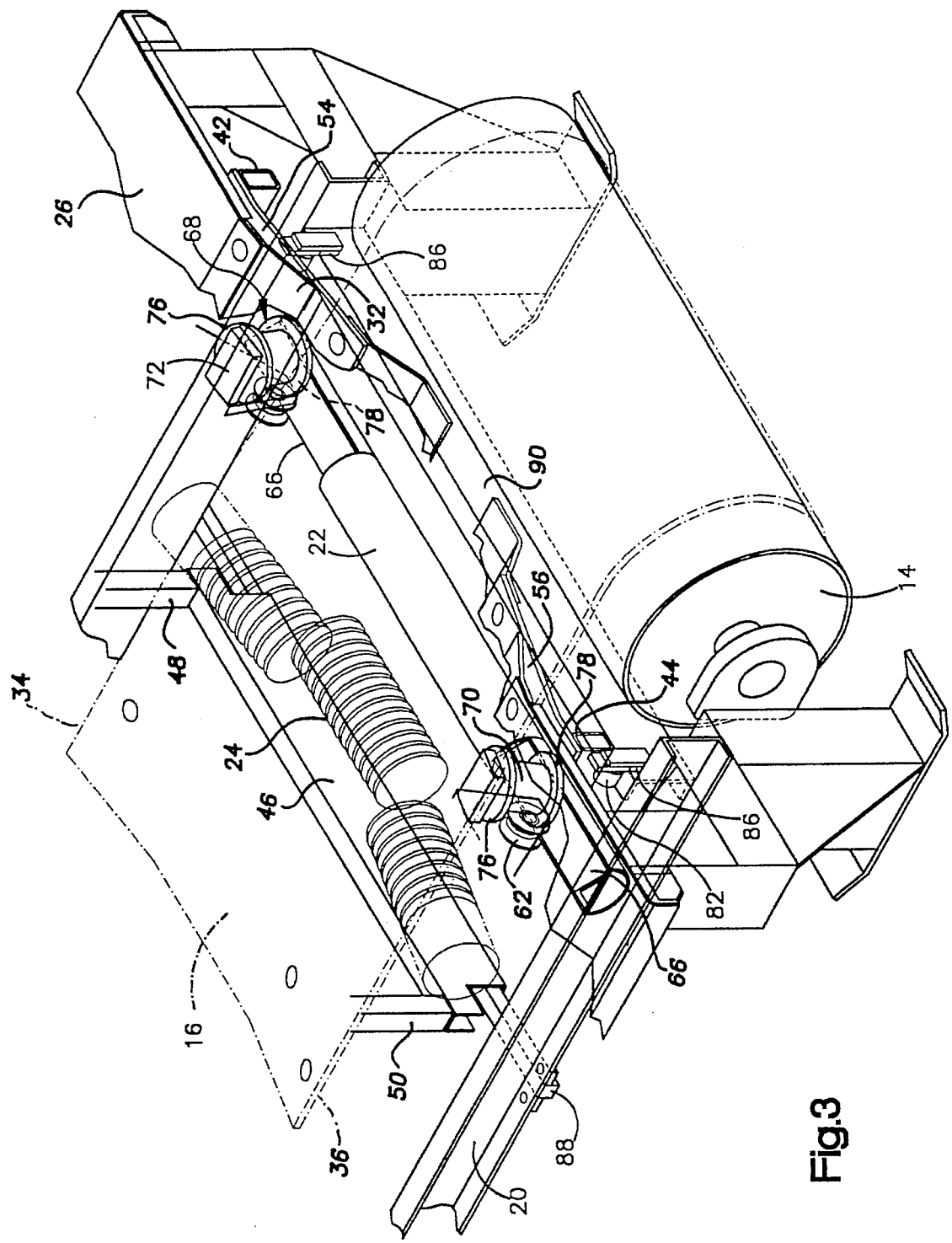
FIG. 3 is a perspective view of a portion of the conveyor illustrating carriage and apron assembly.

There is further provided a mechanism to ensure that the carriage 40 will not be fouled or tangled by the belt 12 to such an extent that the entire carriage 40 is transported longitudinally by the belt. To this end, there is provided a mechanism which permits lateral shifting of the carriage 40 but which prevents movement of the carriage in the direction of belt travel. As may be seen most clearly in FIGS. 1A and 3, this mechanism comprises a pair of rollers 82 rotatably mounted on a beam 84 which depends from each side rail 42 and 44. Each roller 82 rides on one leg of an L-shaped beam 90, and the other leg of the L-shaped beam is engaged by a bronze slider pad 86.

Although the preferred embodiments of this invention have been shown and described, it should be understood that various modifications and rearrangements of the parts may be resorted to without departing from the scope of the invention as disclosed and claimed herein.

What is claimed is:

1. A belt conveyor for transporting material, comprising:

an endless belt having longitudinal edges defining a material carrying reach and a return reach, a frame supporting said belt, means for driving said belt along a longitudinal path, loading skirt means positioned above said belt at a loading station, said loading skirt means having a surface which slopes downwardly toward a central portion of the belt for directing material onto the central portion of said belt, said loading skirt means being mounted for movement relative to said frame in directions transverse to said path, and means responsive to any lateral shifting of said belt from said predetermined longitudinal path to shift said skirt means in directions and amounts corresponding to directions and amounts of said lateral shifting of said belt.

2. A belt conveyor according to claim 1, wherein said loading skirt is mounted on a carriage, said carriage being mounted on transverse guide means on said frame which permits said movement relative to said frame.

3. A belt conveyor according to claim 2, wherein said carriage is provided with a plurality of transverse rollers which cooperate with transverse tracks provided on said frame.

4. A belt conveyor according to claim 3, including a plurality of edge rollers mounted on said carriage and being positioned to be engaged by the lateral edges of said belt upon any lateral shifting of said belt from said longitudinal path.

5. A belt conveyor according to claim 4, wherein said belt conveyor is a trough conveyor having a multiplicity of trough-shaped idler rolls which support a trough-shaped belt section, said conveyor having a cylindrical tail pulley, said belt being wrapped around said tail pulley and having a flat section engaging a face of said pulley, the longitudinal edges of said belt having an upward curve from said flat section to said trough-shaped belt section, said edge rollers being canted to engage said lateral edges of said belt at an angle of about 90°.

6. A belt conveyor according to claim 5, including means to interlock said carriage to said frame to prevent movement of said carriage in a direction of belt travel.

7. A belt conveyor according to claim 6, including means to limit upward movement of said carriage relative to said frame.

8. A method of depositing material onto a central portion of a laterally shifting conveyor belt comprising the steps of:

depositing material from a fixed discharge position spaced above said belt onto the central portion of said belt;

providing a loading skirt between said belt and said fixed discharge position, said loading skirt being adapted to laterally shift relative to said fixed discharge position and thereby laterally deflect said material;

sensing incremental lateral deviations of said belt and its central portion from a centered position beneath said fixed discharge position, and;

shifting said loading skirt in response to sensed deviations of said belt from its centered position, said shifting being in incremental distances directly corresponding to the incremental lateral deviations of said belt so that said material is deflected by said loading skirt and continues to be deposited onto said central portion of said belt during said lateral deviations.

* * * * *